April 19, 1966 W. A. PALMER 3,247,126
INTERMITTENT FILM TRANSPORT AND MOTION
PICTURE CAMERA USING SAME
Filed Nov. 13, 1961 11 Sheets-Sheet 1

INVENTOR.
William A. Palmer
BY
Attorneys

INVENTOR.
William A. Palmer
BY
Attorneys

April 19, 1966

W. A. PALMER 3,247,126

INTERMITTENT FILM TRANSPORT AND MOTION
PICTURE CAMERA USING SAME

Filed Nov. 13, 1961

INVENTOR.
William A. Palmer
BY
Attorneys

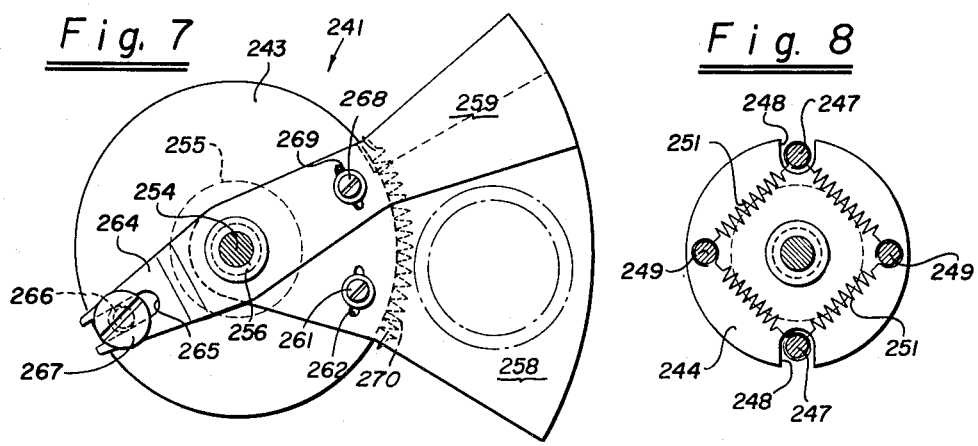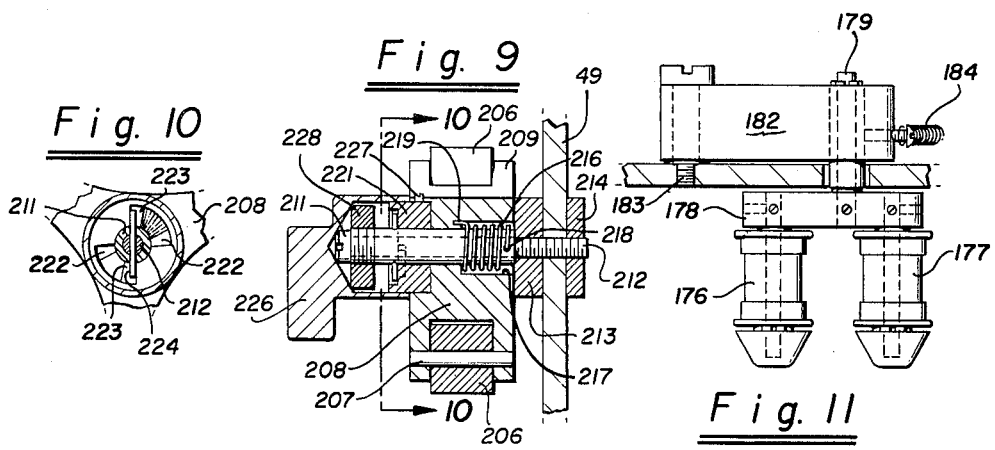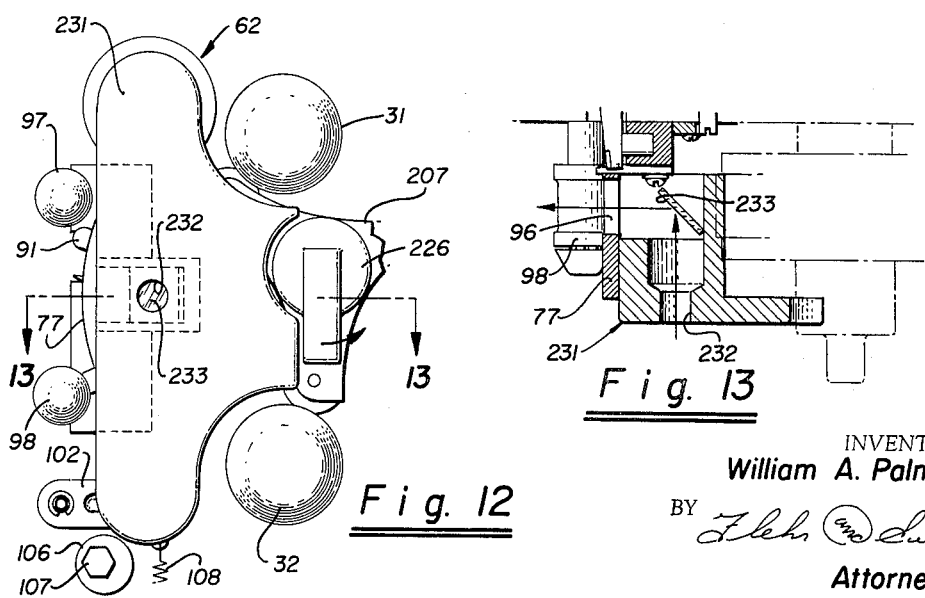

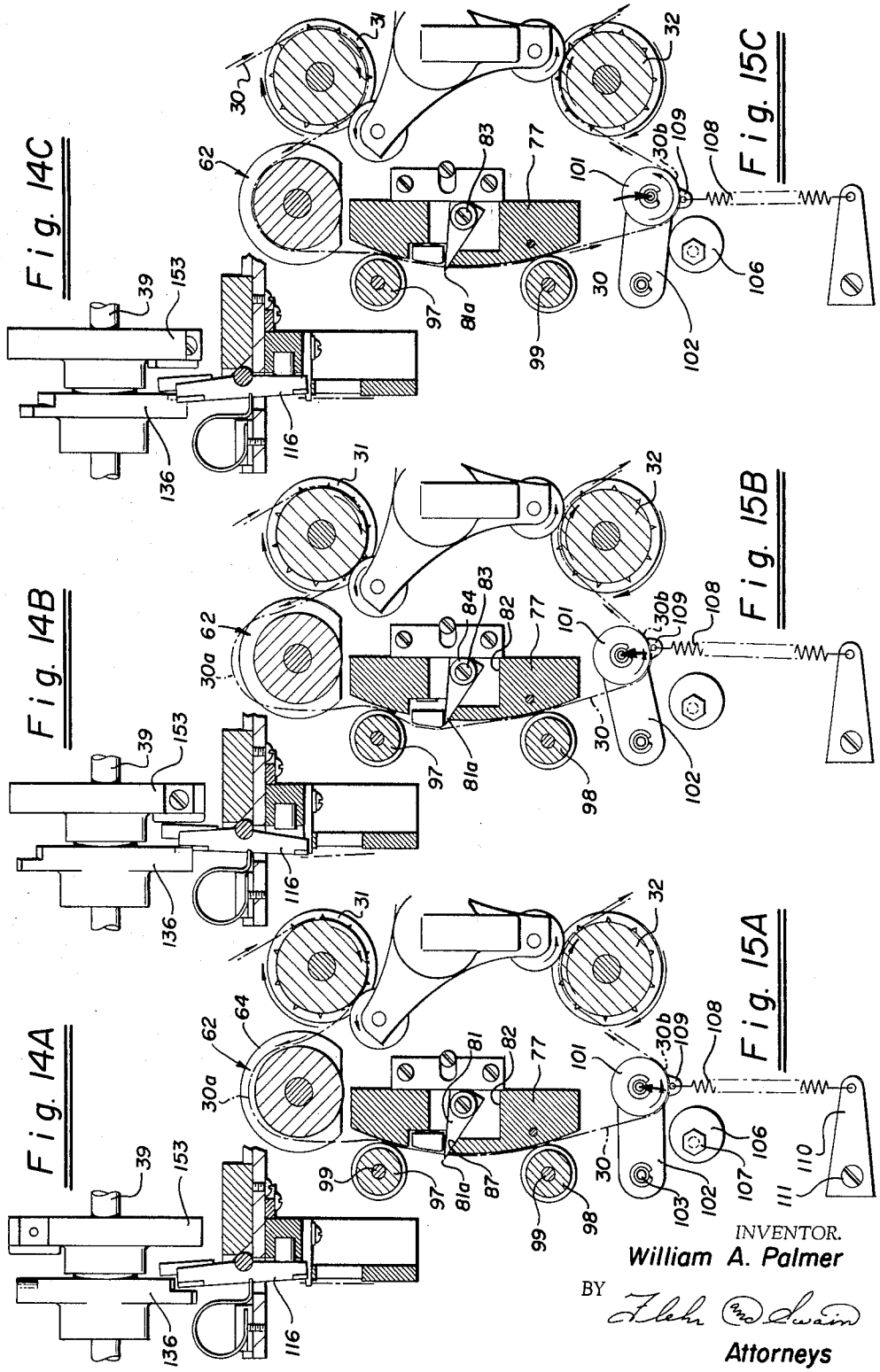

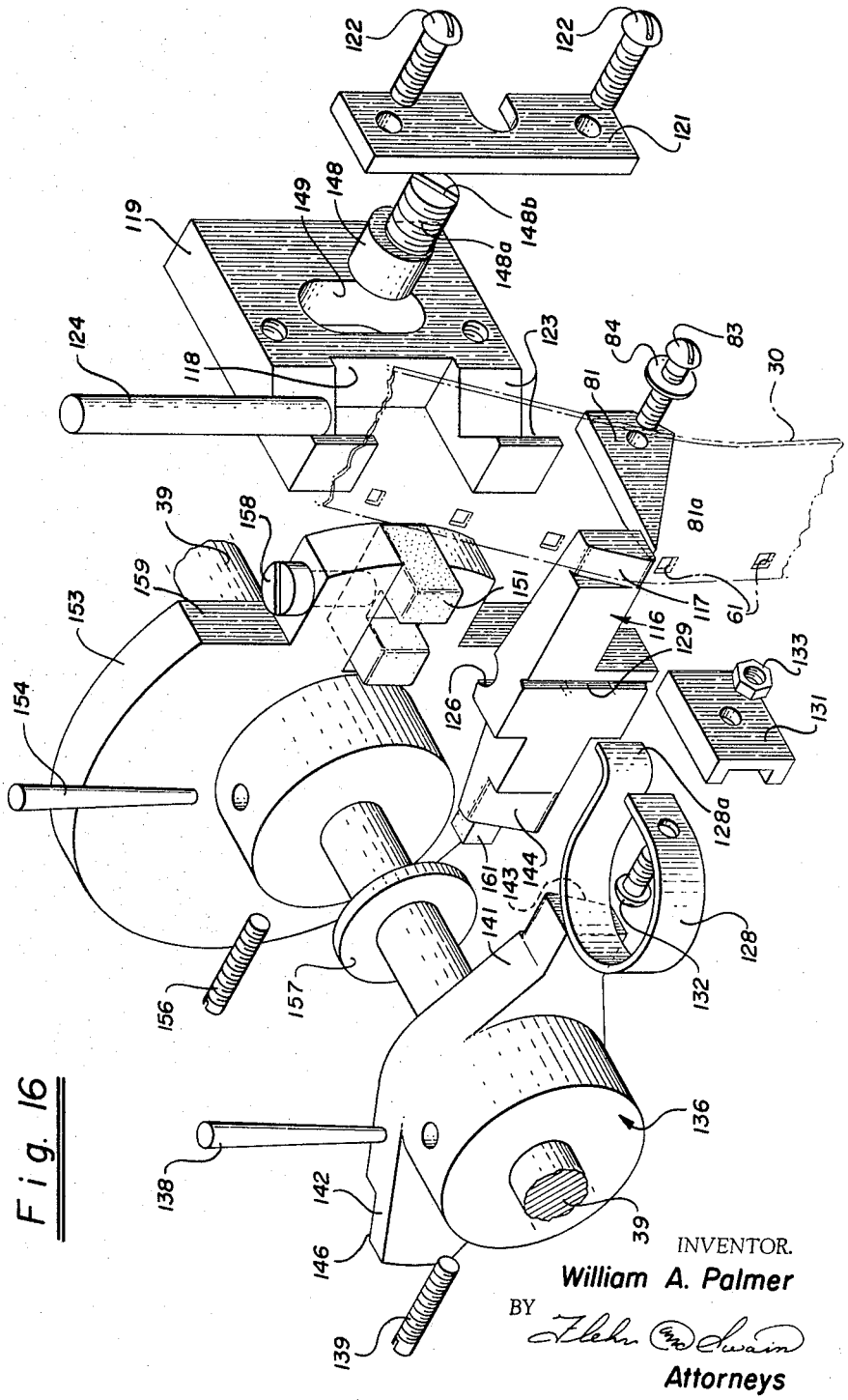

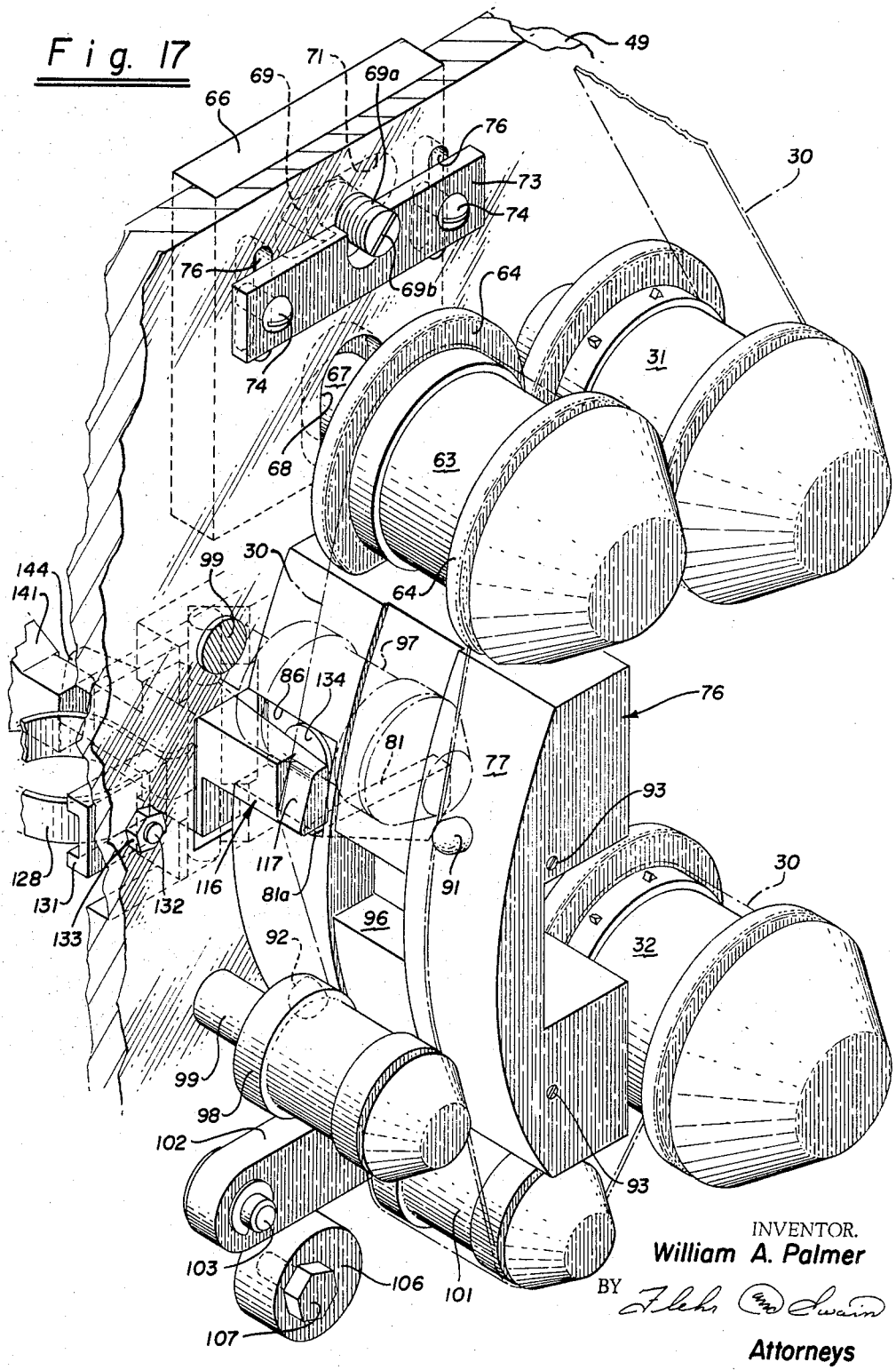

April 19, 1966 W. A. PALMER 3,247,126
INTERMITTENT FILM TRANSPORT AND MOTION
PICTURE CAMERA USING SAME
Filed Nov. 13, 1961 11 Sheets-Sheet 10

INVENTOR.
William A. Palmer
BY
Attorneys

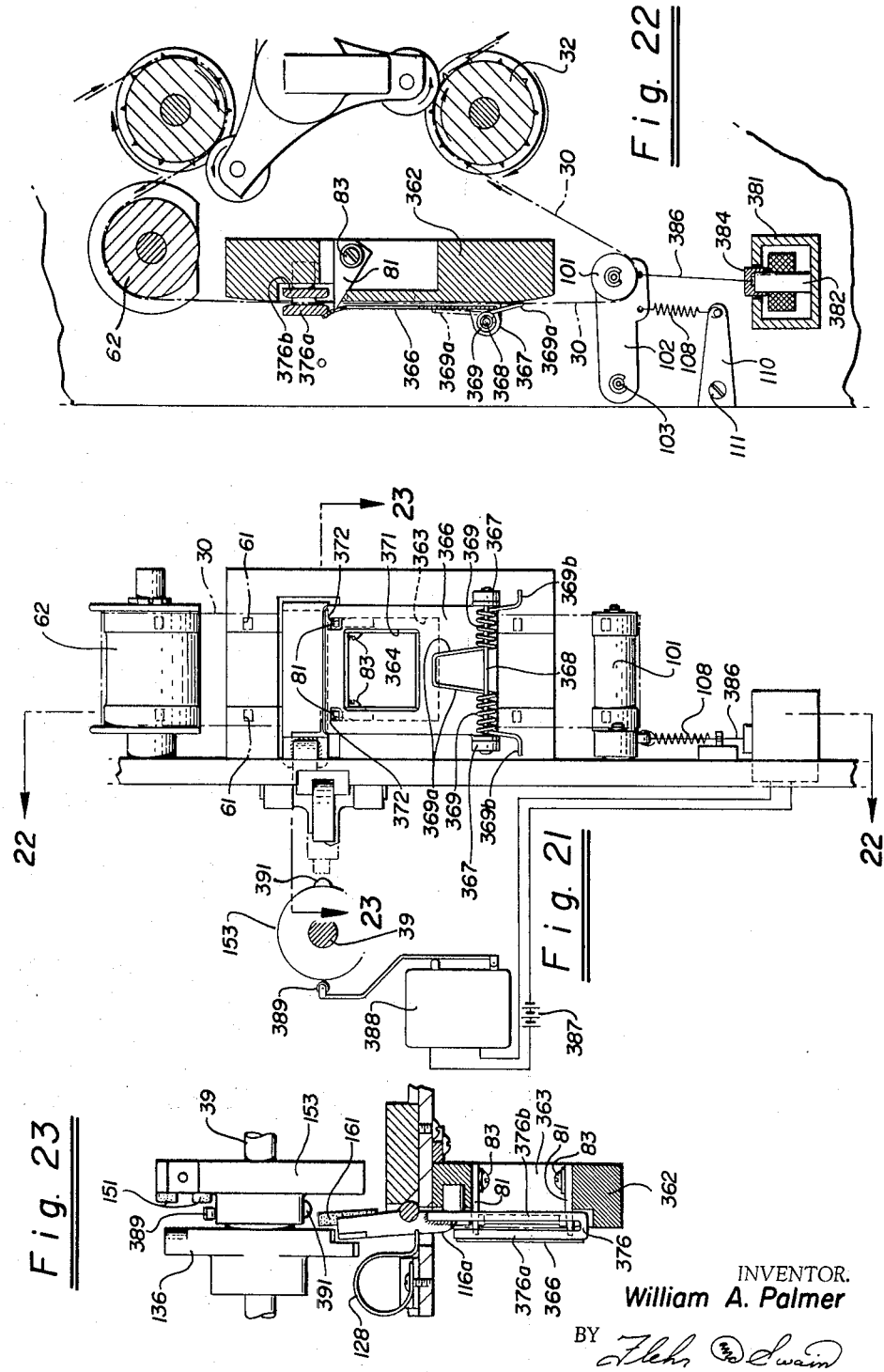

United States Patent Office 3,247,126
Patented Apr. 19, 1966

3,247,126
INTERMITTENT FILM TRANSPORT AND MOTION PICTURE CAMERA USING SAME
William A. Palmer, Menlo Park, Calif., assignor to W. A. Palmer Films, Inc., San Francisco, Calif., a corporation of California
Filed Nov. 13, 1961, Ser. No. 151,811
10 Claims. (Cl. 352—184)

This invention relates to an intermittent film transport and method and motion picture camera using same, and more particularly to an intermittent film transport and method which provides a very fast film pull-down.

In motion picture equipment, it is very often desirable to provide a rapid film pull-down. For example, in a camera, this would make it possible to increase the actual time that the film per frame can be exposed. As explained in my Patent No. 2,809,234, it is desirable in video recording to provide a mechanism which will make it possible to pull down the film within approximately 30°, in $30/360$ of $1/24$ of a second, assuming that the camera is operating at 24 frames per second. As also explained in my Patent No. 2,809,234, it is desirable to decrease the pull-down time as much as possible so as to make it possible to cause the "picture splice" to take place over a greater number of lines. In fact, it is particularly desirable to provide a pull-down mechanism which will operate in the blanking period, to thereby eliminate the need for a "picture splice." Since the blanking period has a length of approximately 1.4 milliseconds, the pulldown must occur in approximately 11 degrees. It is, therefore, apparent that there is a definite need for an intermittent film transport and method providing a fast pull-down and a motion picture camera which utilizes such an intermittent film transport and method.

In general, it is an object of the present invention to provide an intermittent film transport and method and a motion picture camera utilizing the same which overcomes the above named disadvantages.

Another object of the invention is to provide an intermittent film transport and method in which a very fast film transport is obtained.

Another object of the invention is to provide an intermittent film transport and method of the above character in which the film transport or pull-down is intermittent.

Another object of the invention is to provide an intermittent film transport and method on which 8 mm. or 16 mm. film can be used interchangeably.

Another object of the invention is to provide a transport and method of the above character which does not deform or tear perforations in the film.

Another object of the invention is to provide a transport and method of the above character in which precise film registration is obtained.

Another object of the invention is to provide a transport and method of the above character which eliminates the need for costly mechanical construction.

Another object of the invention is to provide a transport and method of the above character which has few moving parts.

Another object of the invention is to provide a transport and method of the above character which can be easily threaded.

Another object of the invention is to provide a transport and method of the above character which has few parts which are subject to wear.

Another object of the invention is to provide a motion picture camera which is relatively simple to construct.

Another object of the invention is to provide a motion picture camera which is particularly adapted for television or video recording.

Another object of the invention is to provide a motion picture camera which performs with great precision.

Additional objects and features of the invention will appear from the following description in which the preferred embodiments are set forth in detail in conjunction with the accompanying drawings.

Referring to the drawings:

FIGURE 7 is a cross-sectional view taken along the line 7—7 of FIGURE 5.

FIGURE 8 is a cross-sectional view taken along the line 8—8 of FIGURE 5.

FIGURE 9 is a cross-sectional view taken along the line 9—9 of FIGURE 3.

FIGURE 10 is a cross-sectional view taken along the line 10—10 of FIGURE 9.

FIGURE 11 is a cross-sectional view taken along the line 11—11 of FIGURE 3.

FIGURE 12 is a view showing the means provided for viewing the film frame in the aperture in the film shoe.

FIGURE 13 is a cross-sectional view taken along the line 13—13 of FIGURE 12.

FIGURES 14A, B and C are cross-sectional views of the means utilized for pushing the film off of the registration pin showing the same in various operating positions.

FIGURES 15A, B and C are cross-sectional views of the film transport mechanism in its various positions corresponding to the positions of the film push-off mechanism shown in FIGURES 14A, B and C, respectively.

FIGURE 16 is an enlarged exploded view of the portion of the intermittent film transport used for pushing the film off of the register pin.

FIGURE 17 is an enlarged exploded view of a portion of the intermittent film transport and particularly shows the film guide shoe.

Figure 18:
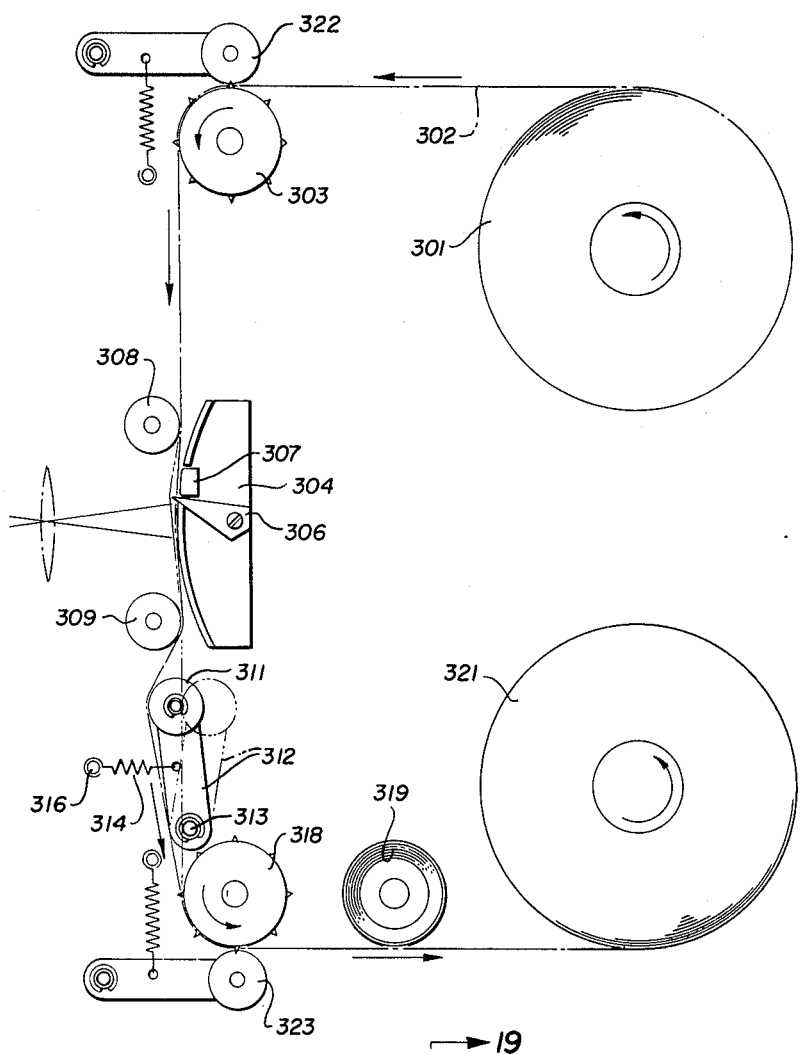

FIGURE 18 is a plan view of another embodiment of my intermittent film transport.

Figures 19, 20:
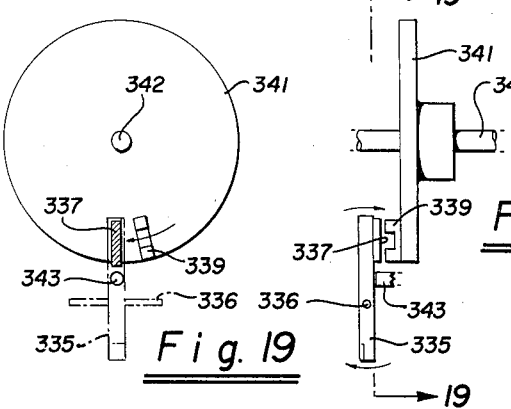

FIGURE 19 is an elevational view of another embodiment of my film push-off mechanism taken along the line 19—19 of FIGURE 20.

FIGURE 20 is a side elevational view of the push-off mechanism shown in FIGURE 19.

FIGURE 21 is a front elevational view of another embodiment of my intermittent film transport.

FIGURE 22 is a cross sectional view taken along the line 22—22 of FIGURE 21.

FIGURE 23 is a cross sectional view taken along the line 23—23 of FIGURE 21.

In general, my method for transporting film intermittently across an aperture consists of registering the film at a predetermined position, continuously advancing the film so that a loop is formed in the film while it is registered in the predetermined position, taking up the film continuously on the other side of the predetermined position, continuously applying a force on the film at a position on said other side of the predetermined position of the film to yieldably urge the film from the predetermined position to form a loop, and intermittently releasing the film from the predetermined position so that the film is advanced and again registering the film at the predetermined position. One intermittent film transport for advancing film having perforations therein consists of a film shoe against which the film is adapted to ride and a registration pin mounted in the film shoe adapted to engage the perforations in the film to hold the film in a predetermined position. It also consists of a snubbing post or arresting guide which is mounted on one side of the film shoe and means for continuously advancing the film over the snubbing post and forming a film loop over the snubbing post during the time the film is held in the predetermined position by the registration pin. Take-up means is mounted on the other side of the film shoe for continuously taking up the film, and means is provided for engaging the film between the film shoe and the take-up means which yieldably and continuously applies a force to the film to urge the film away from the shoe to form a loop in the film which is decreased in size as the film is taken up. Means is also provided for intermittently removing the film from the registration pin to permit the means yieldably applying a force to the film to advance the film upon the shoe until another perforation in the film engages the registration pin.

As shown in the drawings, the motion picture camera utilizing my intermittent film transport consists of a case 11 of suitable material such as aluminum which is provided with front and rear walls 12 and 13, side walls 14 and 16, a top wall 17, and a bottom wall 18. The side wall 14 is provided with a front door 19 and a rear door 21 which are hinged at 22 and 23, respectively, and which are provided with opening knobs 24 and 26, respectively. The front door 19 gives access to a lens and shutter compartment 27, whereas the rear door 21 gives access to a compartment 28 which contains an intermittent film transport 29, as hereinafter described.

My intermittent film transport 29 consists of means for continuously advancing a film which takes the form of a feed sprocket 31 and means for continuously taking up the film 30 which takes the form of a take-up sprocket 32. Means is provided for driving both of these sprockets continuously and in substantial synchronism and consists of a motor 33 mounted on the rear wall 13 of the case 11 as hereinafter described. The motor 33 is provided with an output shaft 34 upon which a timing sprocket 36 is fixed. The timing sprocket 36 drives a timing belt 37 of conventional construction which drives another sprocket 38 mounted on a drive shaft 39. The drive shaft 39 is rotatably journalled in pillow blocks 41 secured to a vertical longitudinal wall 43 mounted within the case 11. The sprockets 36 and 38 have a ratio so that the synchronous speed of the motor 33 is reduced to the desired speed for the shutter mechanism 44. As is well known to those skilled in the art, the shutter for a motion picture camera operating at 24 frames per second should be driven at 1440 revolutions per minute. Thus, assuming that the output speed from the synchronous motor 33 is 1800 r.p.m., the sprockets 36 and 38 should have a 5:4 ratio to give the desired 1440 r.p.m.

The shaft 39 carries a worm 46 which drives a worm gear 47 affixed to a shaft 48. The shaft 48 is rotatably mounted in the wall 43 and another vertical longitudinally extending wall 49 which is parallel to the wall 43. The sprocket 31 is affixed to the shaft 48 in the compartment 28 and is driven by the shaft 48. The worm 46 and the worm gear 47 provide a suitable speed reduction such as a 10:1 speed reduction so that the film 30 is advanced ten frames for each turn of the sprocket 31. As hereinafter described, each revolution of the shaft 39 causes the film 30 to be advanced one frame.

The take-up sprocket 32 is driven by a timing belt 52 which is driven by a sprocket 53 affixed to the shaft 48. The timing belt 52 drives sprockets 54 and 56 which are mounted on shafts 57 and 58, respectively. The shafts 57 and 58 are rotatably mounted in the walls 43 and 49. The take-up sprocket 32 is affixed to the shaft 57. Another sprocket 59 is affixed to the shaft 58.

From the foregoing description, it can be seen that as the motor 33 is operated, the sprockets 31 and 32 will be continuously operated to advance and take up the film 30 in my intermittent film transport. Both of the sprockets 31 and 32 are geared together by the timing belt 52 so they operate in synchronism.

The film 30 is of a conventional type and is provided with perforations 61 on one side thereof which are spaced apart in a conventional manner. The sprocket wheels 31, 32 and 59 are provided with teeth as shown on one side thereof which are adapted to engage the perforations 61 provided in the film.

The film 30, as it is advanced by the sprocket 31, is advanced over a snubbing post 62 which is affixed to the wall 49. The snubbing post which also may be called an arresting guide is provided with a substantially cylindrical portion 63 and a pair of radially extending guide flanges 64 disposed on opposite ends of the cylindrical portion 63. The cylindrical portion 63 has a substantial diameter so that it provides a relatively large surface for arresting the movement of the film as hereinafter described.

Means is provided for adjusting the position of the snubbing post or arresting guide 62 and consists of a block 66 (see FIG. 17) which is disposed on the other side of the wall 49 and which carries a post 67 upon which the arresting guide 62 is mounted. The post 67 extends through a vertical slot 68 provided in the wall 49 to permit vertical movement of the post 67 and the arresting guide 62 carried thereby. An eccentric 69 is rotatably mounted in a slot 71 provided in the block 66. The eccentric is provided with an extension 69a which extends through the wall 49 and which is provided with a tool receiving slot 69b so the same can be rotated. It will be noted that as the eccentric 69 is rotated, the block 66 will be raised and lowered to raise and lower the arresting guide 62 for a purpose hereinafter described. Means is provided for affixing the arresting guide in a predetermined adjusted position and consists of a bar 73 which is affixed to the block 66 by screws 74 extending through slots 76 provided in the plate 49. It is readily apparent that by tightening the screws 74, the block 66 can be clamped in a predetermined position with respect to the partition or wall 49.

Figure 3:
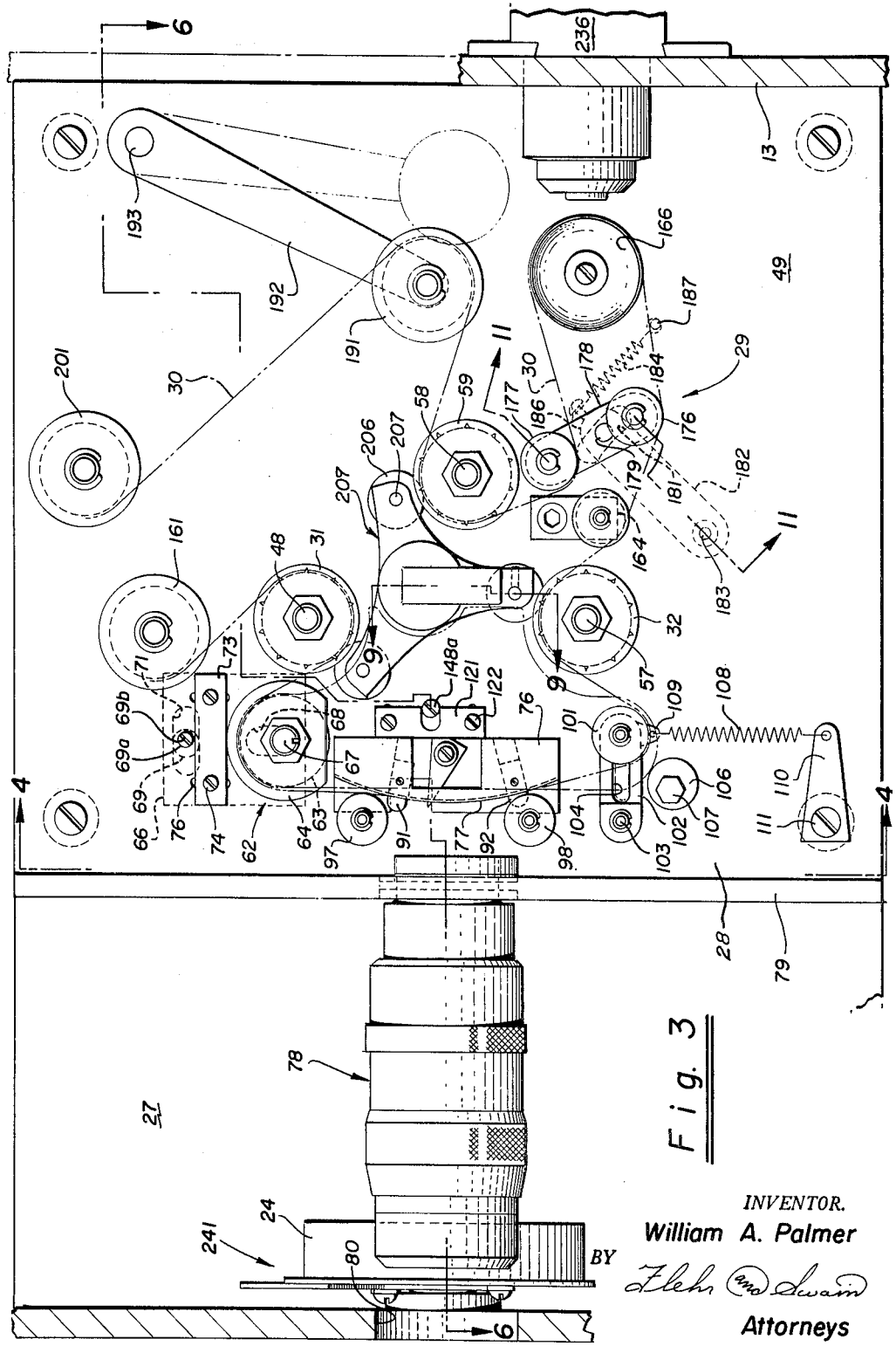
FIGURE 3 is a cross-sectional view taken along the line 3—3 of FIGURES 2 and 4.
Figure 4:
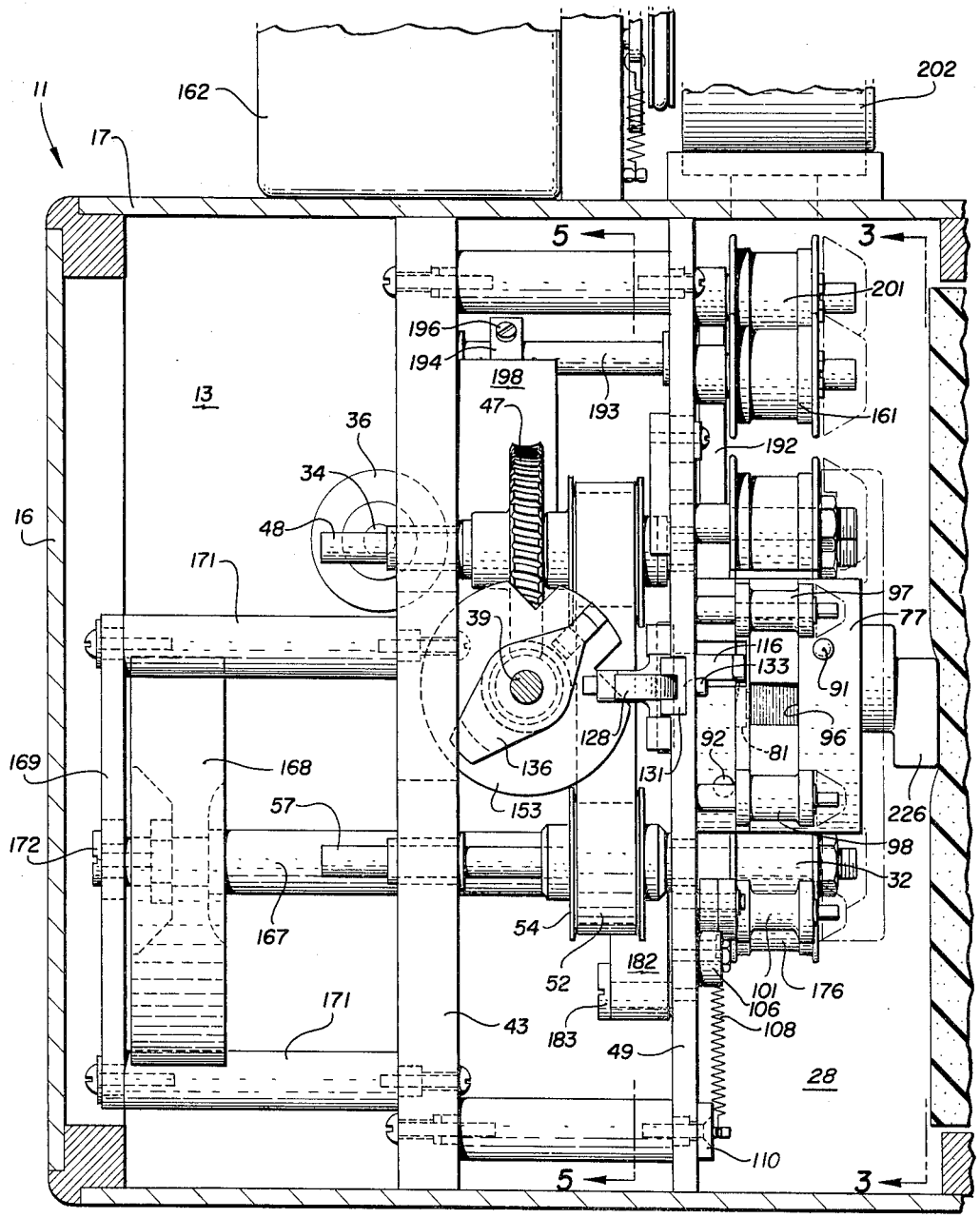
FIGURE 4 is a cross-sectional view taken along the line 4—4 of FIGURE 3.

As can be seen particularly in FIGURE 3, after the film has been advanced over the arresting guide or snubbing post 62, the film passes downwardly over a film shoe 76. The film shoe 76 is elongate as shown and is provided with a curved convex surface 77 which is adapted to be engaged by the film. This slight curvature of the shoe is provided to prevent cupping of the film as it passes behind the lens 78 which is mounted in a vertical laterally extending wall 79 provided within the case 11. The front wall 12 is provided with an opening 80 through which the lens 78 is exposed to the light. As is well known to those skilled in the art, the film has a tendency to cup or to become concave because of the difference in shrinkage between the gelatin surface and the base provided.

Although the particular frame of the film 30 immediately behind the lens may have its upper and lower portions spaced a distance from the lens which is slightly further than the center of the frame, the difference is so small that it does not appreciably effect the sharpness of the picture which is recorded on the film. Moreover, if it is desired to eliminate even this small difference, an optical element (not shown) can be located behind the lens which will compensate for this slight curvature of the film at the point of exposure behind the lens 78. I have found that it is much more important to eliminate the cupping of the film by the use of the curved shoe. The curved shoe 76 makes it possible to hold the film in a more precise focal plane than would otherwise be possible. The film shoe 76 is arranged so that its longitudinal axis extends vertically and so that the film is passed downwardly in a vertical plane behind the lens 78.

Means is provided on the film shoe for registering the film, or, in other words, holding the film 30 in a predetermined position or zone on the film shoe and consists of a triangularly shaped registration member or pin 81 which is mounted on one side wall of a rectangular recess 82 provided in the rear of the film shoe 77 by suitable means such as a capscrew 83 and a washer 84.

It will be noted, as shown in FIGURES 15A, B and C, that the film shoe 77 is also provided with a small aperture 87 which has the same configuration as the point 81a provided on the pin 81 so that when the pin 81 is pushed into the aperture as far as it will go, it will be properly positioned. As will be noted, the aperture is shaped so that the registration pin is inclined upwardly at a substantial angle as, for example, an angle of approximaetly 30°. Such an arrangement is particularly satisfactory in that it permits ready replacement of the registration pin when required. It is merely necessary to push the pin 81 as far into the aperture 87 as it will go and then fasten it into place by the capscrew 83.

The registration pin is positioned in such a manner that its point 81a extends a substantial distance beyond the convex surface of the shoe 77 so that it is adapted to engage the perforations provided in the film 30 as hereinafter described. In addition, the registration pin 81 is positioned laterally of the shoe so that it is in alignment with the row of perforations 61 provided in the film 30.

Additional means is provided for positioning the film 30 laterally of the guide shoe as it passes downwardly over the guide shoe and consists of a pair of ground glass rods 91 and 92 which are mounted in holes in the film shoe 77 and retained therein by set screws 93. As shown particularly in FIGURE 17, the outer ends of the glass rods are burnished so that they are rounded. They are also positioned in such a manner that one of the glass rods is mounted on the upper end of the shoe on one side of the film, and the other is mounted on the lower end of the shoe on the other side of the film. The glass rods have been found to be particularly satisfactory for this purpose in that they create very little friction because of their hardness and smoothness. The rods 91 can be rotated to a new position merely by loosening the set screws 93. If necessary, the glass rods 91 can be readily and inexpensively replaced. The rounded surfaces provided on the outer ends of the rods facilitate sliding the film into its position between the glass rods.

As shown in the drawings, means is provided for yieldably and continuously pulling downwardly on the film as it is held in a predetermined position by the register pin 81. Since the register pin 81 is only on one side of the film, it is apparent that if it were not for the glass rods 91 and 92, there would be a tendency for the film to be canted or pulled diagonally across the film shoe. The glass rods 91 and 92 together with the registration pin 81 provide a three point control for positioning the film at the predetermined zone or at the viewing aperture 96 provided in the film shoe to prevent such an occurrence.

Additional means is also provided for retaining the film in engagement with the shoe and consists of a pair of retaining rollers 97 and 98 which are rotatably mounted on the stub shafts 99 extending outwardly from the wall 49. The retaining rollers 97 and 98 are positioned in such a manner that they engage the film at positions spaced substantially above and below the exposure zone for the film in the camera. Therefore, in conjunction with the two glass rods 91 and 92 and the registration pin 81, the rollers 97 and 98 serve to lock the film in a precise position or zone during exposure of the same.

The means for continuously and yieldably urging the film 30 downwardly consists of a roller 101 which engages the film to provide a loop 30b in the film before it is taken up by the take-up sprocket 32. The roller 101 is rotatably mounted on a lever arm 102 which is pivotally mounted on the wall 49 by pin 103. It will be noted that the lever arm 102 is provided with a slot 104 to permit adjustment of the roller 101 longitudinally of the arm. Means is provided for limiting the lowermost point of travel of the roller 101 and consists of a circular stop member 106 which is mounted off center on the wall 49 by a cap screw 107. The means for yieldably and continuously urging the roller 101 downwardly consists of a spring 108 which has one end fixed to an ear 109 provided on the lever 102 and the other end fixed to a retaining member 110 fixed to the wall 49 by one of the cap screws 111 used for fastening the wall 49 within the case 11.

Means is provided for causing relative movement between the film 30 and the registration pin 81 or, in other words, for intermittently removing the film 30 from the registration pin 81 to permit the means yieldably applying a force to the film to advance the film downwardly over or past the film shoe 77 until another perforation in the film engages the registration pin 81. This means consists of a push-off bar 116 which is formed of a suitable material such as Nylatron which is a trademark for nylon in which molybdenum has been incorporated. The use of this material is desirable because it has excellent anti-friction properties and is light in weight. The push-off bar 116 is provided with an inclined surface 117 on one end thereof which is adapted to engage the side margin of the film 30 bearing the perforations. It will be noted that the end of the push-off bar 116 carrying the inclined surface 117 is positioned in the rectangular recess 86 provided in the film shoe 77 so that it lies immediately above the registration pin so that it will be in an excellent position for pushing the film off of the registration pin 81.

The push-off bar 116 is disposed within a rectangular recess 118 provided in a block 119. The block 119 is secured to the wall 49 by a plate 121 which is mounted on the other side of the wall 49 and by screws 122 which extend through the plate 121 and the wall 49 and are threaded into the block 119. The block 119 is also formed with V-shaped recesses 123 which receive the ends of a cylindrical rod 124 and serve to hold the rod 124 in a fixed position between the block 119 and the wall 49. The push-off bar 116 is provided with a half cylindrical depression or recess 126 which serves as a bearing surface which rides upon the rod 124 so that the rod 124 serves as a fulcrum about which the push-off bar 116 operates. The push-off bar 116 is retained in engagement with the rod 124 by a C-shaped spring 128 which has one end 128a engaging a V-shaped notch 129 in the push-off bar 116. The other end of the spring 128 is mounted in a U-shaped plate 131 and is fixed to the wall 49 by a cap screw 132 and a nut 133.

It will be noted that the notch 129 in the push-off bar 116 is located off center with respect to the semi-cylindrical recess 126 in the push-off bar 116 so that the spring 128 retains the push-off bar 116 against the rod 124 and also yieldably retains the push-off bar 116 in its normal position within the recess 86 against a stop pin 134 in the film shoe 77 out of engagement with the film 30. Thus, the C-spring 128 serves a dual function in that it holds the push-off bar 116 on the rod 124, and in that it acts as a restoring means for the push-off bar. In addition, it serves to take up any lost motion which may occur due to wear of the parts.

Means is provided for operating the push-off bar 116 so that it pushes the film off of the registration pin 81. It consists of a cam member 136 which is fixed to the drive shaft 39 by a pin 138 and a set screw 139. The cam member is provided with two diametrically opposed extensions 141 and 142 with extension 142 serving as a counterweight for the extension 141. The extension 141 is provided with an inclined surface 143 which is adapted to engage an inclined surface 144 provided on the other end of the push-off bar 116. The inclined surfaces 143 and 144 face so that the end 117 of the push-off bar will be pushed out of the recess 86 in the film shoe 77 to engage the film 30 and to push it off of the registration pin 81 as the extension 141 passes the push-off bar 116. The extension 142 is provided with a recess 146 so that it will clear the push-off bar 116. However, as hereinafter explained, if the camera is utilized for 8 mm. film, the camera can be readily adapted for such use by changing the cam 136 so that the extension 142 also operates the push-off bar 116 so that the push-off bar 116 is operated twice as often.

Means is provided for adjusting the position of the rod 124 which serves as the fulcrum for the push-off bar 116 and consists of an eccentric 148 which is mounted in a vertical slot 149 provided in the block 119. The eccentric 148 is provided with an extension 148a which extends through the wall 49. It is also provided with a tool receiving groove 148b to permit rotation of the eccentric to move the fulcrum rod 124 back and forth relative to the C-spring 128 to thereby position the push-off bar 116 relative to the registration pin 81. When the push-off bar 116 has been properly positioned, it is fixed in this position by tightening the screws 122.

In view of the fact that the push-off bar 116 must operate very rapidly, there may be a tendency for substantial wear to occur between the surfaces 143 and 144 provided on the cam 146 and on the push-off bar 116. This wear is particularly due to the fact that extremely high accelerations are required in order to obtain the desired rapidity of movement of the push-off bar 116. It is for this reason that the push-off bar 116 is constructed of Nylatron so that the friction is reduced to a minimum. I have also provided additional means to reduce the friction between the push-off bar 116 and the cam 136 during the time the push-off bar is being operated which takes the form of magnetic means. This magnetic means consists of a small horse-shoe type magnet 151 which is mounted in a recess 152 that extends radially into a wheel member 153 fixed to the drive shaft 39 by a pin 154 and a set screw 156. A small spacer washer 157 is provided on the shaft 137 between the cam 136 and the wheel member 153. The magnet 151 is held in place by a cap screw 158 as shown particularly in FIGURE 16. The wheel member 153 has been provided with cutouts 159 to counterbalance the magnet 151. An armature 161 of magnetic material is mounted in the push-off bar 116 on the end of the push-off bar opposite the end which is adapted to engage the film 30 and is adapted to be attracted by the rotating magnet 151. It will be noted that the magnet 151 is positioned in such a manner that it applied its attractive forces to the magnet 161 at the time the cam member 136 engages the push-off bar 116 and that it aids the action of the cam member 136 to urge the film outwardly from the film shoe and off of the registration pin 81.

Although I have provided two separate means for operating the push-off bar 116, it should be apparent that either means can be used independently for operating the push-off bar 116. The mechanical operating means provided in the form of the cam 136 provides a positive operation of the push-off lever on every rotation of the cam 136. In the embodiment shown in FIGURE 16, the magnetic means consisting of the magnet 151 and the armature 161 merely serves as aiding means to reduce the wear between the cam 136 and the push-off bar 116.

Additional means is provided within the compartment 28 for guiding the film and consists of a guide roller 161 rotatably mounted on the wall 49. The guide roller 161 guides the film 130 as it leaves a magazine 162 mounted on the top wall of the camera 17. The magazine 162 is of a conventional 16 mm. type and carries a suitable length of film such as 1200 feet which will provide 33 minutes of recording time operating at 24 frames per second. As the film 30 leaves the take-up sprocket 32, it passes under an idler 164 affixed to the side wall 49. Thereafter, it passes over a sound drum 166. The sound drum 166 is free-running and is connected to a shaft 167 which is rotatably mounted in the walls 43 and 49 by suitable means such as ball bearings. A flywheel 168 is mounted on the other end of the shaft 167. The flywheel 168 and one end of the shaft 167 are supported by a diagonal member 169 which has its ends secured to posts 171 affixed to the wall 43. The diagonal member 169 is secured to the flywheel 168 by a screw 172 to provide support for the flywheel so that it will rotate without vibration.

A pair of idler rollers 176 and 177 engage the film 30 before and after it leaves the sound drum 166 and serves as isolating means as hereinafter described. The two idler rollers 176 and 177 are rotatably mounted upon opposite ends of a common support member 178. The common support member 178 is pivotally mounted upon a pin 179 which extends through an elongate slot 181 in the wall 49 and which is mounted on one end of an arm 182. The arm 182 is pivotally mounted on the wall 49 at point 183. It will be noted that the common support member 178 is pivotally mounted on the pin 179 at a point which is off center of the common support member 178. A spring 184 having one end attached to the free end of the arm at 186 and having the other end connected to the wall 49 at 187 is provided for urging the arm 182 in a clockwise direction as viewed in FIGURE 3 or, in other words, towards the sound drum.

The idlers 176 and 177 serve to maintain a substantially continuous tension of the film as it passes around the sound drum 166. The mechanism supporting the idler rollers 176 and 177 is such that it serves to isolate disturbances on the film from the sound drum 166. For example, if a slight pulse should come from the take-up sprocket 32 which has a tendency to increase the tension on the film, there will be a tendency for the roller 176 to come up or for the arm 182 to rotate in a counter-clockwise direction. This will cause the companion idler roller 177 to tend to pull up the slack on the other side of the sound drum 166. Thus, the net disturbance is one of merely increasing the tension of the film on the sound drum. The sound drum 166 with the large flywheel 168 has sufficient inertia to keep the sound drum going at a substantially constant rate. Thus, in summary, a slight push on one side puts an equal and opposite push on the other side of the sound drum so that the net force is not one of disturbing the constant velocity of the sound drum but merely to place a momentary tightening of the two sides of the film against the sound drum.

The film 30, after it leaves the idler roller 177, passes over the sprocket 59. Thereafter, it passes over a guide roller 191 which is rotatably mounted on one end of an arm 192 which is affixed to shaft 193 rotatably mounted in the wall 49. Another arm 194 is affixed to the shaft 193 by suitable means such as a set screw 196. The arm 194 is adapted to engage the operating lever 197 of the Mircroswitch 198 mounted on the wall 49. The film 30, after it passes over the guide roller 191, passes over a fixed guide roller 201 which is mounted on the wall 49. Thereafter, the film 30 passes into the take-up reel provided in the magazine 162 on top of the camera. The take-up reel in the magazine 162 is driven by a small motor 202 which is mounted on the top wall 17 of the case 11. The switch 198 is connected to the motor 202 and is operated by the lever 194 when the tension on the film 30 becomes too great and pulls the guide roller 193 to the left as viewed in FIGURE 3.

Means is provided for retaining the film 30 in engagement with the film advancing sprocket 31, the take-up sprocket 32, and the sprocket 59, so that it cannot accidently slip off of the sprockets. This means consists of three small rollers 206 which are rotatably mounted in the three arms 208 of a trifurcated spider-like member 209. These rollers 206 serve as pad idlers and the spider-like member 209 serves to hold them all in position simultaneously. The spider-like member 209 is rotatably mounted upon a cylindrical member 211 which is threaded on a rod 212. The rod 212 is threaded into a spacer 213 through the wall 49 and into a retaining member 214. A coil spring 216 is seated in a well 217 provided in the spider-like member 209 and has one end affixed to the cylindrical member 211 at 218 and the other end of the spring affixed to the spider-like member at 219. An insert member 221 is provided on the spider-like member 209 and is formed with two pairs of shoulders 222 and 223 which are adapted to be engaged by a pin 224 fixed in the stationary cylindrical member 211 and post 212. A handle 226 is affixed to the member 221 by suitable means such as a set screw 227. A nut 228 is mounted within the end of the handle 226 and is threaded onto the stationary cylinder 211. When the handle 226 is rotated in a counter-clockwise direction as viewed in FIGURE 12, the shoulders 223 are moved out from under the pin 224. At the same time the handle 226 is being rotated, the rollers 206 carried by the spider-like member are being rotated out of engagement with their associated sprockets 31, 32 and 59. As soon as the shoulders 223 have cleared the pin 224, the coil spring 216 urges the spider-like member 209 outwardly away from the wall 49 until the shoulders 222 engage the stationary pin 224. In this position, the pad idlers 206 are in an out-of-the-way position to facilitate threading of the film onto the sprockets. When the film threading is completed, the pad idlers are repositioned merely by pushing inwardly on the handle 226 towards the wall 49. As soon as the shoulders 222 have been pushed away from the pin 224, the coil spring 216 causes rotation of the spider-like member 209 and the pad idlers 206 snap the same into position against the associated sprockets.

Figure 6:
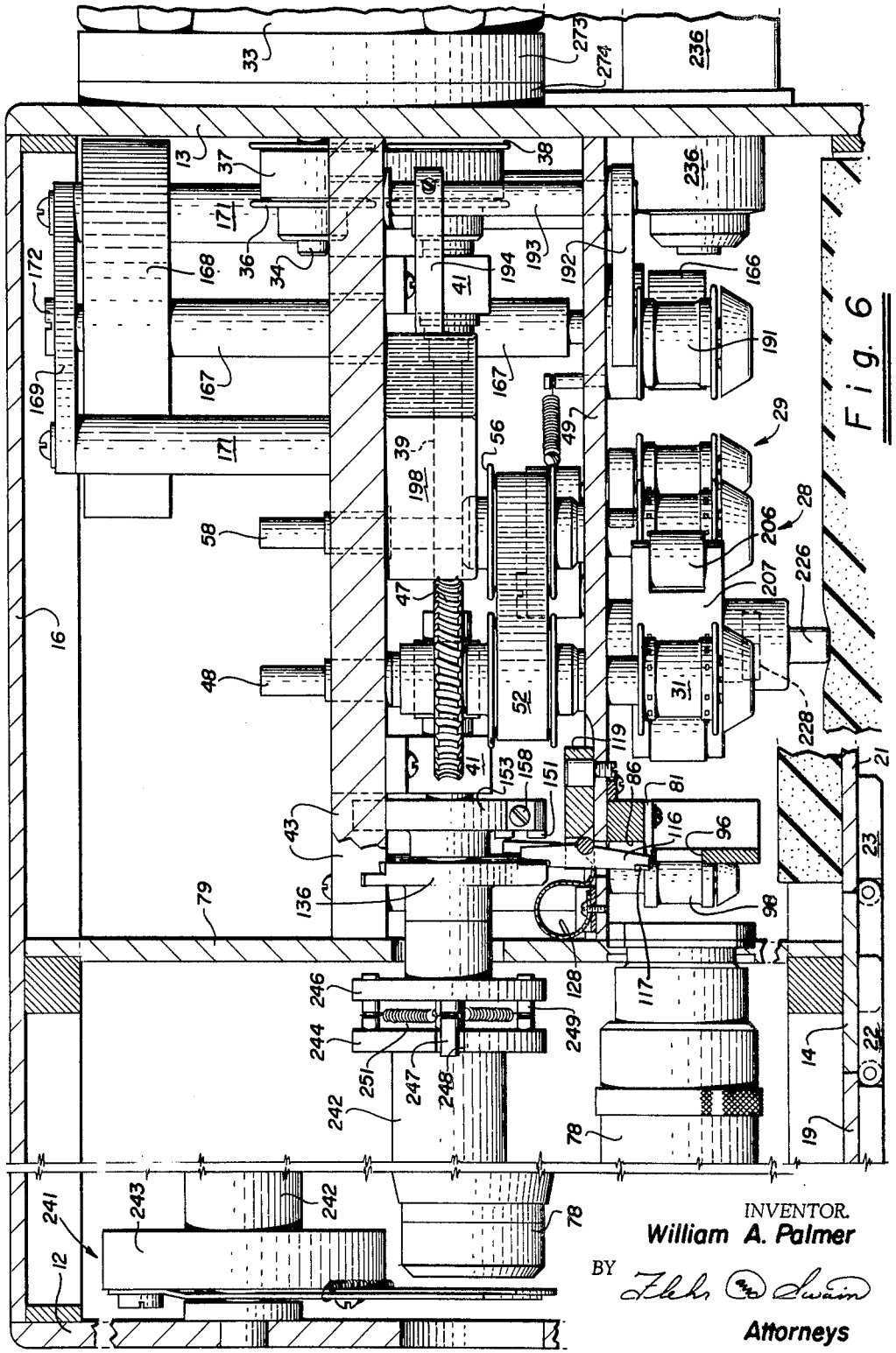
FIGURE 6 is a cross-sectional view taken along the line 6—6 of FIGURE 3.

This arrangement is particularly advantageously in the event the operator forgets to reposition the pad idlers. Upon closing of the rear door 21, the rear door 21 engages the handle 226 as is shown in FIGURE 6 to push it inwardly. As soon as the handle 226 is pushed inwardly, the pad idlers are automatically snapped into position as hereinbefore described.

A cover plate 231 is provided for the camera and, as shown in FIGURE 12, serves to cover a substantial portion of the snubbing post 62 and the roller 101. The cover plate 231 is provided with a sighting aperture 232 to permit viewing of the film positioned in the aperture 96 in the film shoe 77 by means of a mirror 233 which is positioned within the cover plate 231, as shown particularly in FIGURE 13.

Figure 1:
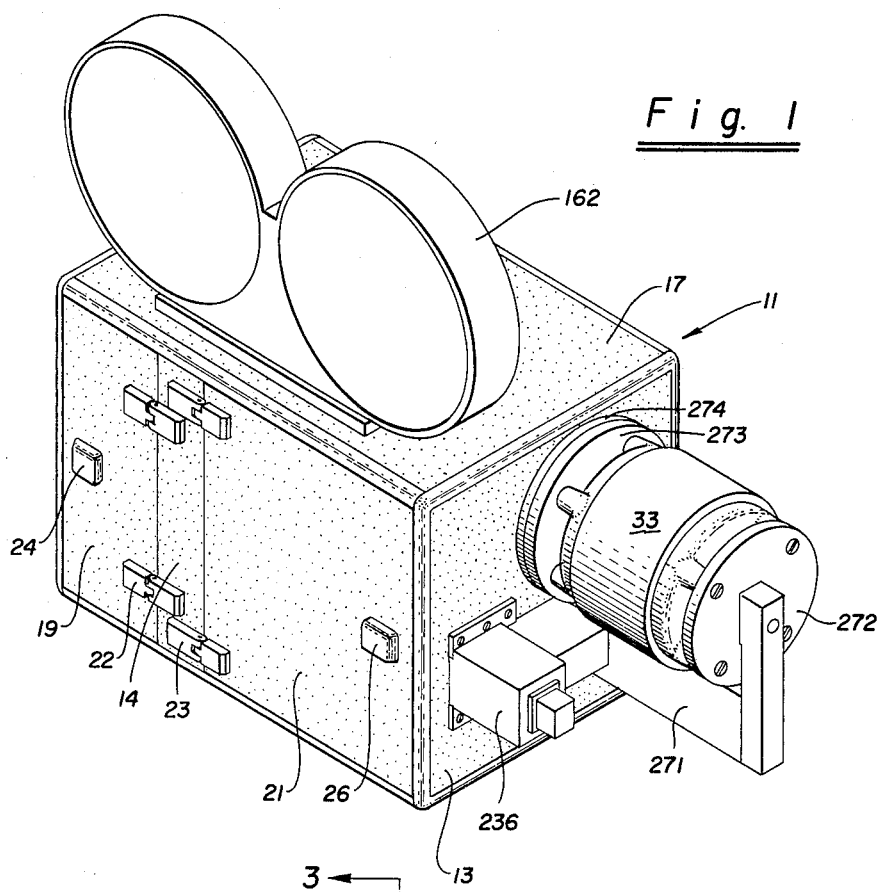
FIGURE 1 is an isometric view of a camera incorporating my invention.
Figure 2:
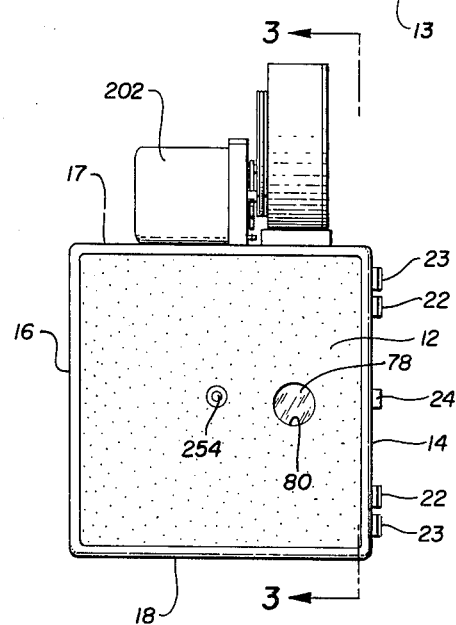
FIGURE 2 is a front elevational view of the motion picture camera shown in FIGURE 1.

A conventional optical type sound recording device 236 is mounted in the rear wall 13 of the case 11 of the camera. It is positioned adjacent the sound drum 166, as shown particularly in FIGURES 1 and 3, to record the sound on the film in a manner well known to those skilled in the art. For example, the device 236 can be a variable density mirror type modulator. It is apparent that, if desired, a magnetic head may be placed within the sound drum to scan the back of the film to magnetically record the sound track on the tape.

In front of the lens 78, there is provided a shutter assembly 241 of the type similar to that described in my Patent No. 2,809,234. It consists of a relatively large cylindrical member 242 of a relatively large mass to provide a larger inertia to obtain the desired flywheel effect in the shutter assembly. The cylindrical member 242 is provided with a large circular radially extending flange 243 on its front end and a similar radially extending flange 244 on its rear end. Means is provided for connecting the cylindrical member 242 to drive shaft 39 and to provide mechanical damping between the drive shaft 39 and the cylindrical member 242. It consists of a flanged hub 245 which extends through a hole 246 in the wall 79 and which is affixed to the shaft 39. The flanged hub 245 is provided with a pair of pins 247 which extend into slots 248 provided in the flange 244 of the cylindrical member 242. Similarly, the flange 244 is provided with a pair of pins 249 which extend into the similar recesses 250 provided in the flanged member 245. Four springs 251 are connected between the pins 247 and 249, as shown particularly in FIGURE 8. The springs 251 provide a resilient coupling between the flanged hub 245 and the cylindrical member 242.

Figure 5:
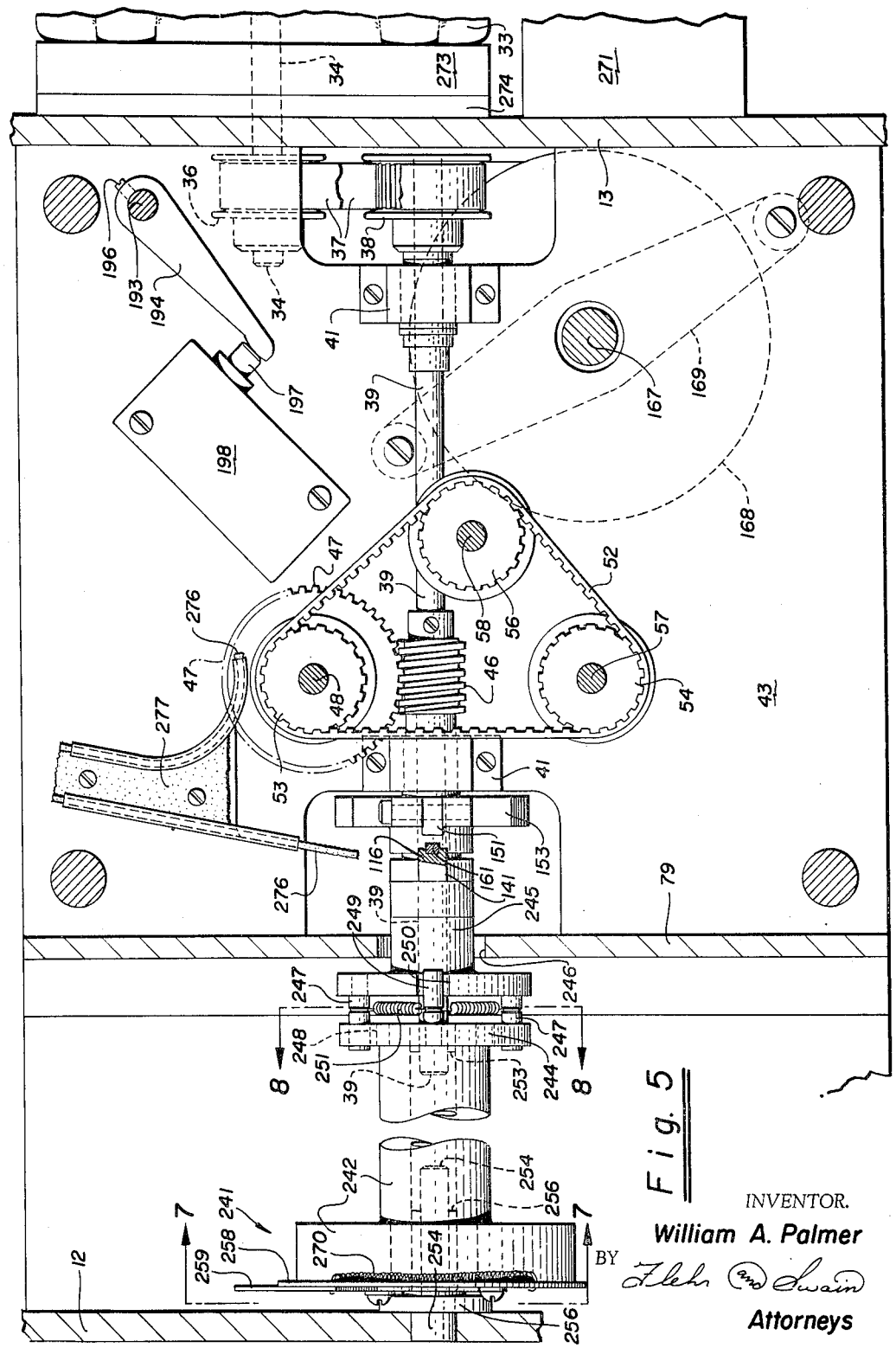
FIGURE 5 is a cross-sectional view taken along the line 5—5 of FIGURE 4.

It will be noted as shown particularly in FIGURE 5 that the cylindrical member 242 has one end rotatably mounted upon the end of the shaft 39 which is positioned within a bushing 253 provided in the cylindrical member 242. The other end of the cylindrical member 242 is rotatably mounted upon a stub shaft 254 which is affixed to the front wall 12. The cylindrical member 242 is rotatably mounted upon the stub shaft 254 by means of a flanged bushing 256.

The shutter assembly 241 consists of two blades 258 and 259 which are formed of a suitable material such as aluminum. One of the blades, blade 258, is wider than the other blade 259 and can be called the fixed blade. The blade 258 is provided with a hole so that it can be mounted on the flanged bushing 256. A retaining screw 261 extends through a slot 262 provided in the blade 258 and is threaded into the flange 243 to provide a rough adjustment of the shutter width. This adjustment of the shutter blade 258 is made so that the smaller blade 259 is in approximately the center of its adjusting position as shown in FIGURE 7. The smaller shutter blade 259 is also provided with a central hole and is mounted on the flanged hub 256. The shutter blade 259 is provided with a forked end portion 264 which has a slot 265 which receives a cam member 266 rotatably mounted upon the flange 243. By rotation of a knurled knob 267 affixed to the cam 266, the angular position of the shutter blade 259 can be readily adjusted. Means is provided for locking the smaller shutter blade 259 in the desired position and consists of a locking screw 268 which extends through an elongated slot 269 provided in the smaller blade 259 and is threaded into the flange 243. A spring 270 is provided around the outer periphery of the circular element or flange 243 and engages the outer edge of the blade 259 and the outer edge of the blade 258 as shown in FIGURE 7. This spring 270 is provided for the purpose of biasing the blade 259 against the cam member 266 so that there is no play when an adjustment is made.

In adjusting my camera to obtain the optimum shutter width, it is merely a matter of loosening the screw 267 and indexing the cam 266 to the desired position, and locking the smaller shutter blade 259 in position, running a series of photographic tests and continuing this procedure until the shutter is of an optimum size. As explained in my Patent No. 2,809,234, the shutter is calibrated so that the shutter bar is removed from the recorded video image.

Means is provided for phasing the shutter assembly 241 with the video synchronizing pulses. Although such means is not required with my camera, such means may be provided if desired. In the past, it has been desired to provide phasing means so that if shutter bar occurs, the shutter bar will occur in the center of the frame and thus only will occur on every other frame. If the phasing is improper, a shutter bar will occur in each frame if there is a shutter bar. Since the shutter assembly which I use eliminates shutter bar, there is no particular requirement for such phasing means. However, since users of many video recording cameras are in the habit of utilizing such phasing means, I have provided it on my camera.

The phasing means consists of an L-shaped support bracket 271 which is secured to the rear wall of the camera. A circular plate 272 is rotatably mounted on the support member 271 and one end of the motor 233 is affixed to a circular plate 273 which is rotatably supported by a plate 274 affixed to the rear wall 13 of the case 11 of the camera. It is only necessary to be able to rotate the motor through 90° assuming that a four pole 1800 r.p.m. motor is being utilized. The maximum change from one position to the other will be 1/20 of a second which will be one-half of the distance between the poles which would be 45°. By rotating the motor, the shutter action can be phased to the particular power supply being utilized for driving the motor 33.

Means is provided for oiling the worm gear 47 and the cam member 136 which operates the push-off bar 116 and consists of a pair of felt strips 276 mounted in a bracket 277 affixed to the wall 43. The strips are supplied with lubricating oil from a well (not shown) to provide constant lubrication to the cam 136 and the gear 147.

*Operation*

Operation of my camera may now be briefly described as follows. Let us assume that the film 30 is in the position shown in FIGURE 15A. When the film is in this position, the film push-off mechanism is in the position shown in FIGURE 14A. When the film is in the position shown in FIGURE 15A, a frame of the film is being held in a precise focal plane or zone by the registration pin 81 and by the rollers 97 and 98. The film is held in this stationary position or zone during the time it is being exposed in the camera. During the time a frame is held in the exposure zone by the registration pin 81, the film 30 is being continuously advanced by the film sprocket 31. As this occurs, a film loop 30a of increasing size is formed above or on one side of the film shoe 77 to provide slack above the arresting guide 62 as shown particularly in FIGURE 15A.

At the same time that this is occurring, the film sprocket 32 is continuously taking up the film to decrease the size of the film loop 30b to thereby raise the roller 101 and increase the tension on the spring 108. These operations continue until an appropriate time interval has passed and the cam 136 comes into a position in which it operates the push-off bar 116. The end of the push-off bar 116 underlying the film 30 is pushed outwardly from the film shoe to push the film 30 off of the fixed register pin 81. As pointed out previously, at the time that the cam 136 strikes the push-off bar 116, the magnet 151 is in a position to attract the armature 161 carried by the push-off bar to aid in pushing off the film to thereby decrease the wear between the cam member 136 and the push-off bar 116.

As soon as the film 30 has been pushed off of the fixed register pin 81, there is nothing to hold the film and it is rapidly pulled downwardly by the tensioned spring 108. The film 30 is pulled down rapidly because the only restriction on its speed is the inertia of the film itself and the inertia of the very small parts associated with the roller 101. Downward movement of the film continues until it is arrested when the loop 38a comes into engagement with the arresting guide 62 or snubbing post 62 as shown in FIGURE 15C. When the film is arrested, the next film perforation 61 pops onto the fixed register pin 81. It should be noted that the film is stopped completely by the arresting guide 62 before the push-off bar 116 returns. For this reason there can be no scratching of the film or tearing of perforations by the registration pin.

Because of the relatively large surface area of the arresting guide or snubbing post 62, there is very little strain placed on the film itself. Most of the shock of the downward movement of the film is taken up by the arresting guide 62 and very little strain is placed on the perforations in the film which are seated on the teeth 62 provided on the film sprocket 31. The perforation on the take-up sprocket 32, of course, take up some small amount of the shock, but this is distributed over at least four or five teeth on the take-up sprocket 32 and for that reason there is very little strain on the perforations.

Thus, as soon as the downward movement of the film has been arrested by the arresting guide 62 and the next perforation in the film has snapped over the pin 81, the next frame in the film is ready for exposure. After the frame is exposed, the film can again be pushed off of the registration pin to cause the same sequence of operations.

As hereinbefore described, means is provided for adjusting the arresting guide 62 vertically with respect to the film shoe 77 so that when the film is arrested or stopped by the arresting guide 62, a perforation in the film is immediately opposite the point 81a of the registration pin 81. I have found that this is a very simple adjustment to make and can actually be made while the camera mechanism is in operation. In fact, it can generally be done by operating the adjusting cam 69 until the mechanism is operating correctly. After the adjustment has been made, the screws 74 can be tightened to hold the arresting guide in the desired position.

Once the film has been pulled down, the push-off lever is restored to its normal position by the action of the spring 128 as shown in FIGURE 14C. This occurs immediately after the film has been pushed off so that when the film is arrested by the arresting guide 62, it is ready to drop back onto the registration pin 81 and into engagement with the film shoe 77 so that the portion of the film which is to be exposed is always in the same exact focal plane. As also explained previously, the position of the fulcrum for the push-off lever 116 can be adjusted by rotation of the cam 148 and then locking it in the desired position by the cap screws 122.

It should be apparent from the foregoing that the speed of the pull-down is largely determined by the amount of spring force provided by the spring 108. This spring force can be readily adjusted by adjusting the position of the member 109 or by actually providing different springs having different spring forces in place of spring 108.

During the operation of my intermittent film transport, I have found that there is some noise which is created when the film snaps down upon the arresting guide 62. I have found that this noise is caused by the rapid ejection of air from between the film loop and the snubbing post 62. However, I have found that this noise is not objectionable because it can be readily kept within the case 11 because the noise is air borne. Thus, when the doors of the camera case are closed, the camera is very quiet operating.

By way of example, I have found that it is possible to readily achieve a film pull-down with my intermittent film transport which can be accomplished easily in less than 30°. In one embodiment of my camera, I have found that it is actually possible to achieve a pull-down within 10° with great reliability. With such a short pull-down it is possible to pull down the film within the blanking period in a television system.

From the foregoing description, it can be seen that I have provided a novel intermittent film transport in which a fixed degister pin is provided for holding the film during the time it is being exposed. The tension provided by the spring 108 serves to hold the film onto the pin during this time. The spring pull-down utilized by me actually performs two functions. First, it causes a very fast pull-down because of the stored energy in the spring. In addition, however, the spring 108 during exposure of the film is pulling the film tightly against the film shoe so that it is unnecessary that the fixed register pin 81 be of a precise construction.

As hereinbefore pointed out, it is not absolutely necessary to utilize a fixed register pin but that, if desired, a movable pin could be utilized which would be retracted from the perforation in the film when it is desired to permit the spring to pull the film down rather than pushing the film off of the pin with a separate push-off lever. The primary advantage of utilizing a fixed register pin is that since it is fixed, it is known that it will always be in the same position. If a movable register pin were utilized, it would be necessary to provide relatively precision parts for moving the pin in and out of the perforations in the film which would inchease the cost of the transport mechanism.

Although thus far I have described my intermittent film transport in conjunction with a video recording camera, it is readily apparent that the teaching relative to this intermittent film transport can be utilized in any type of motion picture camera or motion picture projector. A very fast pull-down would be of distinct advantage in a conventional motion picture camera because this would make a greater amount of time available for exposure of the film. In instrumentation work, there is a definite need for a short pull-down because during the pull-down some of the events which are occurring are lost because the shutter is closed during this time.

It is readily apparent that although the camera shown in the drawings is adapted for 16 mm. film, it would be relatively simple to utilize it for 8 mm. film. As is well known to those skilled in the art, 8 mm. film is merely formed by taking film which is 16 mm. in width with 8 mm. perforations. The only major change which would be required would be in the cam 136 which would be provided with a cam surface on the counterweight portion of the cam which also would operate the push-off bar 116. The 8 mm. film would be run through the camera twice. The film is exposed on one side during the first pass through the camera and then exposed on the other side during the second pass through the camera. The film thereafter is split lengthwise and the ends spliced together.

The results which I have been able to obtain with my intermittent film transport have been very superior. The film is very steady and there is no tendency for chatter or jitter to occur in the film. The mechanism itself is relatively simple and requires very few replacement parts.

In FIGURE 18, I have shown another embodiment of my intermittent film transport incorporated in a relatively simple projector or camera which particularly lends itself to educational work in that it is very simple to thread the film into the camera or projector. It consists of a film supply reel 301 which supplies film 302 to a feed sprocket 303. The film then passes over a film shoe 304 which is provided with a fixed register pin 306 and a push-off bar 307 of the type hereinbefore described. A pair of rollers 308 and 309 are provided for maintaining the film in contact with the shoe 304. Thereafter, the film passes over a roller 311 which is rotatably mounted on an arm 312 pivoted at 313. The arm 312 is yieldably and continuously urged to the left as viewed in FIGURE 18 by a spring 314 which has one end attached to the arm and has the other end fixed at a point 316. The film then passes over a take-up sprocket 318 and then over a sound drum 319 to a take-up reel 321. Pad idlers 322 and 323 are provided for maintaining the film 302 in engagement with the feed sprocket 303 and the take-up sprocket 318, respectively.

Operation of this embodiment of my invention is very similar to that hereinbefore described. During the time that the film is held by the fixed register pin 306, the film is being advanced by the feed sprocket 303 to provide slack between the feed sprocket 303 and the shoe 304. At the time that this is occurring, the take-up sprocket 318 is taking up the film to decrease the slack between the shoe 304 and the take-up sprocket 318 to urge the roller 311 to the right as viewed in FIGURE 18 to thereby increase the tension on the spring 314.

Thereafter, when the film is pushed off of the fixed register pin 306 by the pusher bar 307, the spring 314 immediately pulls the film 302 across or past the shoe 304 until it is arrested by the feed sprocket 303. At this same time, the feed sprocket is positioned so that when the film is arrested, a perforation in the film will pop onto the fixed register pin 306. The same sequence of operation then takes place as hereinbefore described.

It can be seen that the embodiment shown in FIGURE 18 is relatively simple and provides a means for straight-through threading which has obvious advantages.

Another embodiment of a mechanism for operating a push-off bar is shown in FIGURES 19 and 20 and consists of a push-off bar 335 which is pivotally mounted at 336. It is provided with an armature 337 at one end which is adapted to be attracted by a horse-shoe magnet 339 carried by a wheel 341 mounted on a rotating shaft 342. The mode of operation is similar to that hereinbefore described for the operation of the push-off bar 116 with the exception that the mechanical means for operating the push-off bar has been eliminated and only magnetic means is being provided for operating the push-off bar. A stop 343 has been provided to limit the travel of the push-off bar so that the armature 337 cannot come in contact with the rotating horse-shoe magnet 339. This apparatus has a distinct advantage in that it would not be subject to wear and would last indefinitely.

It is apparent that although I have described my intermittent film transport method particularly in conjunction with 16 mm. and 8 mm. film, that the same type of transport and method may be used for other film sizes such as 35 mm. and 70 mm. film in which multiple perforations are provided for each frame. On such wider films it is often desirable to provide perforations on both side margins of the film. With such film it may be advisable to provide two register pins in the shoe to engage the perforations on both side margins of the film. Also, lateral guidance of the film may be accomplished by the use of a fixed rail and spring loaded edge guides as presently used with conventional intermittent transports.

With the use of larger films such as 35 mm. and 70 mm., it may be desirable to eliminate the curved shoe because of the relatively large frame area which might cause undue distortion. Also with film of this size it may be desirable to provide some type of electrical means for assisting in the initial acceleration of the film during pull down. Such an arrangement is shown in FIGURES 21, 22 and 23 in which a shoe 362 having a planar front fact is provided. The shoe 362 is provided with a recess 363 in which a registration pin 81 has been mounted on each side of the shoe in the recess 363. The registration pins 81 engage the perforations 61 provided on opposite side margins of the film strip 30 as shown in FIGURE 21. The film shoe 362 is also provided with an aperture through which the film can be viewed.

Means is provided for yieldably retaining the film in contact with the front surface of the shoe 362 and can take any suitable form such as an aperture plate 366 which is pivotally mounted between ears 367 provided on the shoe by a pin 368. Means is provided for yieldably urging the aperture plate 366 into engagement with the film and consists of a coil spring 369. One portion 369a of the coil spring engages the aperture plate whereas other portions 369b of the spring engage the shoe. The aperture plate is provided with an aperture 371 through which the film 30 is exposed. The aperture plate is also provided with holes 372 to accommodate the registration pins 81.

Means is provided for pushing the film off of the registration pins 81 and consists of a push-off member 376 which is secured to the push-off bar 116a by suitable means such as welding. As can be seen particularly from FIGURE 23 of the drawings, the U-shaped push-off member 376 is provided with a portion 376a which is in front of the film and a portion 376b which is behind the film. It will be noted that the spacing between the portions 376a and 376b is such to allow easy passage of the film 30 through the same.

The push-off member 376a is operated by the cam member 136 in a manner similar to that described in the previous embodiment. Upon initial movement of the push-off bar, the front portion 376a of the push-off member will push the aperture plate 366 forwardly away from the shoe so as to release the film from between the aperture plate 366 and the film shoe 362. Continued movement of the member 376 to the left as viewed in FIGURE 22 causes the portion 376b to engage the film and to push it off of the registration pins 81 to permit it to be pulled down by the pull down roller 101 in a manner hereinbefore described for the previous embodiment. The pull down of the film is arrested by the snubbing post 62 after which the push-off member 376 returns to its normal position by first permitting the film perforations to snap back onto the registration pins 81 and thereafter permitting the aperture plate 366 to engage the film and hold it in contact with the film shoe 362.

As hereinbefore explained with the larger films it may be desirable to provide additional means for assisting the pull down roller 101 rather than just increasing the spring tension on the spring 108. Such means is shown in FIGURES 21, 22 and 23 and takes the form of electrodynamic assistance means. This means consists of a permanent magnet 381 in which is mounted a pin 382. A cup-shaped coil 384 is mounted in the air gap in the permanent magnet 381 and seats over the pin 382. It is connected by a pull down wire 386 to the lever 102 on which the pull down roller 101 is mounted. The coil 384 is connected to a battery 387 through a normally open Microswitch 388 as shown particularly in FIGURE 21. The Microswitch is provided with an operating lever 389 which is adapted to be operated by a raised portion 391 provided on the rotating member 153. The Microswitch 388 and the raised portion 391 are positioned in such a manner that the Microswitch 388 is operated when the cam 136 strikes the push off bar 116a and also when the permanent magnet 151 attracts the armature 161 carried by the push off bar 116a. Thus immediately after the film has been pushed off of the registration pin 81 a pulse of energy from the battery 387 is applied to the coil 384 to cause it to be moved downwardly to give a strong assist to the spring 108 to thereby rapidly accelerate the film and provide extremely fast pull down.

By utilizing such means it is possible to accomplish a fast pull down without applying undue tension on the spring 108 which may be objectionable because this spring tension would always be present. The pulling force applied by the coil 384 is only applied at the moment it is desired to rapidly accelerate the film downwardly.

The electrodynamic type of assist has been chosen because of the relatively small mass of the moving coil 384. It is possible that other types of electrical means can be utilized such as rotary solenoids. However, such devices have a larger mass which also would have to be accelerated and therefore would have a tendency to lengthen the pull down time.

It is apparent from the foregoing that I have provided an intermittent film transport and method which has many advantages. It provides a very rapid pull-down with a relatively simple mechanism. Also, I have provided a motion picture camera which utilizes this intermittent film transport which is particularly adapted for the video recording.

I claim:

1. In an intermittent film transport for advancing film having perforations therein, a film shoe having a curved surface against which the film is adapted to ride, the film shoe having a viewing aperture formed therein, a registration pin mounted in a fixed position with respect to said film shoe and adapted to engage a perforation in the film to hold the film stationary on the film shoe in proximity to said viewing aperture, an arresting guide mounted on one side of the film shoe and having a forward film engaging surface substantially in line with the curved surface of the film shoe and an upper arcuate surface, continuously rotating feed sprocket means mounted to the rear of the arresting guide and having a lower arcuate surface substantially below the upper arcuate surface of the arresting guide whereby the film travels in an S-shaped path as it is advanced by the feed sprocket means and whereby a loop of increasing size is formed over the arresting guide during the time that the film is held stationary on the film shoe by the registration pin, means mounted on the other side of the film shoe for continuously taking up the film advanced across the film shoe, spring-urged means engaging the film between the film shoe and the take-up means and yieldably applying a force continuously to the film to urge the film past the shoe, and means intermittently moving the film off the registration pin to permit the means yieldably applying a force to the film to urge the film rapidly past the film shoe until the loop overlying the arresting guide is snapped into engagement with the arresting guide and its movement stopped, the spacing between said registration pin and the upper surface of the arresting guide being such that when the arresting guide arrests further movement of the film, a perforation in the film is in substantial alignment with the registration pin and also snaps on to the registration pin so that the film is firmly held in position by the registration pin.

2. An intermittent film transport as in claim 1 wherein said arresting guide consists of a substantially cylindrical portion having a pair of spaced radially extending guide flanges disposed on opposite ends of the cylindrical portion, said cylindrical portion having a substantial diameter so that it provides a relatively large surface for arresting the movement of the film.

3. Apparatus as in claim 2 together with means for adjusting the position of said arresting guide with respect to said registration pin to thereby adjust the spacing between the registration and the upper surface of the arresting guide.

4. An intermittent film transport as in claim 1 together with pad idlers engaging the sprocket means and common means carrying the pad idlers for moving the pad idlers into and out of engagement with the portions of the film engaged by the sprockets, said common means including spring means for yieldably and rotatably urging the pad idlers into engagement with the sprockets when the pad idlers are urged in a direction at right angles to the direction in which they are rotatably urged by the spring means.

5. A transport as in claim 1 wherein said means for intermittently moving the film off the registration pin consists of a push-off bar adapted to engage the film, said film shoe having a recess for receiving the push-off bar, pin means for pivotally mounting said push-off bar for pivotal movement into and out of the recess, spring-urged means engaging the push-off bar and yieldably retaining the push-off bar out of engagement with said film, a rotating shaft, and means mounted on said rotating shaft causing movement of said push-off bar about said pin means against the force of the yieldable means to urge the film off of the registration pin.

6. An intermittent film transport as in claim 5 wherein said last-named means includes an armature mounted on said push-off bar, a rotating shaft, a magnet rotatably carried by the shaft and adapted to attract the armature carried by the push-off bar as the magnet is rotated past the armature to cause pivotal movement of the bar about the pin means.

7. An intermittent film transport as in claim 1 together with electrically operated means for assisting said means yieldably applying a force continuously to the element to urge the element past the shoe, said electrically operated means including a magnet having an air gap, a coil disposed in the air gap, and means connecting the coil to the means yieldably applying a force continuously to the element.

8. In a motion picture camera for photographing video images on film having perforations therein, a film shoe having a curved surface against which the film is adapted to ride and having a viewing aperture therein, a registration pin mounted in the film shoe in a fixed position and adapted to engage a perforation in the film to hold a portion of the film stationary in the viewing aperture in the film shoe, a film arresting guide having a curved surface mounted on one side of the film shoe which is in substantial alignment with the surface of the film shoe, continuously rotating feed sprocket means mounted to the rear of the arresting guide and having its lower surface substantially below the upper surface of the arresting guide for feeding film over the arresting guide so that the film travels in an S-shaped path and forms a loop over the arresting guide which increases in size continuously during the time that the film is held in a stationary position by the registration pin, sprocket means mounted on the other side of the film shoe for continuously taking up the film, spring-urged means engaging the film between the film shoe and the take-up means and yieldably applying a force continuously to the film to urge the film past the shoe and to form a loop in the film between the shoe and the sprocket means for taking up the film, and means for intermittently moving the film off of the registration pin to thereby permit the spring-urged means yieldably applying a force to the film to pull the film past the shoe until the film loop engages the arresting guide and is arrested by the arresting guide, said arresting guide and said registration pin being positioned so that when the film is arrested by the arresting guide another perforation in the film engages the registration pin which again holds a portion of the film stationary in said viewing aperture, an optical system for projecting and focusing light from video images onto the film, said optical system including means defining a lens aperture and shutter means to effect opening and closing of the aperture.

9. A camera as in claim 8 wherein said shutter means includes a rotating shaft, first and second blades mounted on said shaft and rotatable therewith, means for adjusting the position of one of the blades relative to the other of said blades to thereby adjust the angle subtended by the shutter means, said adjustment means including a forked portion provided in one end of said blades and cam means engaging said forked portion for adjusting the position of said blade relative to the other blade.

10. A camera as in claim 8 wherein said shutter means includes a rotating shaft, a circular plate mounted on said shaft, a pair of blades having overlapping portions mounted on said circular plate and subtending a predetermined angle, means for adjusting the angle subtended by said pair of blades, said means including a forked portion provided in one of the blades, and cam means rotatably mounted on said circular plate and engaging the forked portion for shifting the angular position of said one blade relative to the other blade.

References Cited by the Examiner

UNITED STATES PATENTS

| | | | |
|---|---|---|---|
| 1,143,977 | 6/1915 | Kucharski | 352—184 |
| 1,425,461 | 8/1922 | Evans | 352—208 |
| 1,782,470 | 11/1930 | Heisler | 352—157 |
| 2,084,473 | 6/1937 | Becker | 352—157 |
| 2,110,875 | 3/1938 | Holman | 226—84 |
| 2,414,319 | 1/1947 | Milholland | 352—131 X |
| 2,418,545 | 4/1947 | Zimmerman | 226—84 |
| 2,747,457 | 5/1956 | Wengel | 352—184 |
| 2,953,965 | 9/1960 | Stiffler | 352—166 |

FOREIGN PATENTS

| | | |
|---|---|---|
| 683,460 | 11/1939 | Germany. |
| 10,474 | 5/1896 | Great Britain. |
| 643,390 | 9/1950 | Great Britain. |
| 443,085 | 12/1948 | Italy. |

JULIA E. COINER, *Primary Examiner.*

G. Y. CUSTER, *Examiner.*